United States Patent
Amar et al.

(10) Patent No.: US 10,951,627 B2
(45) Date of Patent: Mar. 16, 2021

(54) SECURING ORDERED RESOURCE ACCESS

(71) Applicant: PerimeterX, Inc., San Mateo, CA (US)

(72) Inventors: Barak Mordechai Amar, Ramat Gan (IL); Ben Diamant, Tel Aviv (IL); Ido Safruti, San Francisco, CA (US); Pablo Ariel Sirota, Ra'anana (IL)

(73) Assignee: PerimeterX, Inc., San Mateo, CA (US)

( * ) Notice: Subject to any disclaimer, the term of this patent is extended or adjusted under 35 U.S.C. 154(b) by 66 days.

(21) Appl. No.: 15/784,114

(22) Filed: Oct. 14, 2017

(65) Prior Publication Data
US 2018/0109540 A1 Apr. 19, 2018

Related U.S. Application Data

(60) Provisional application No. 62/408,279, filed on Oct. 14, 2016.

(51) Int. Cl.
*H04L 29/06* (2006.01)
*G06F 21/33* (2013.01)
(Continued)

(52) U.S. Cl.
CPC ............ *H04L 63/108* (2013.01); *G06F 21/00* (2013.01); *G06F 21/335* (2013.01);
(Continued)

(58) Field of Classification Search
CPC . H04L 63/108; H04L 63/0807; H04L 63/068; H04L 63/083; H04L 63/0876; G06F 21/335
See application file for complete search history.

(56) References Cited

U.S. PATENT DOCUMENTS 6,360,254 B1 * 3/2002 Linden ................ G06F 21/31
 709/219
6,453,353 B1 * 9/2002 Win ..................... G06F 21/604
 709/225

(Continued)

FOREIGN PATENT DOCUMENTS

EP 2723033 A1 4/2014

OTHER PUBLICATIONS

IBM. "A Method for Hotlinking Control of Web Resources", IP.com disclosure IPCOM000170215D. May 2008. (Year: 2008).*
(Continued)

*Primary Examiner* — Michael Simitoski
(74) *Attorney, Agent, or Firm* — Fenwick & West LLP

(57) ABSTRACT

Ordered access to resources is controlled by restricting access to additional resources that are accessible when a client device provides an authentication provided when accessing an initial resource. When the client device accesses the initial resources, a set of access parameters are identified describing the request and the client device providing the request, and included with an expiration time in generating a token. The token and expiration date are provided in an authorization for the additional resources. When requesting the additional resources, the authorization is provided and verified by comparing the token in the authorization with a test token generated with reference to access parameters of the request for additional resources. When the tokens match, the additional resource is provided to the client device.

25 Claims, 7 Drawing Sheets

(51) Int. Cl.
 *G06F 21/00* (2013.01)
 *G06F 21/62* (2013.01)
 *G06F 21/10* (2013.01)

(52) U.S. Cl.
 CPC ........ *G06F 21/6218* (2013.01); *H04L 63/068* (2013.01); *H04L 63/083* (2013.01); *H04L 63/0807* (2013.01); *H04L 63/0876* (2013.01)

(56) References Cited

U.S. PATENT DOCUMENTS

| | | | | |
|---|---|---|---|---|
| 7,260,836 | B2* | 8/2007 | Roskind | H04L 63/083 709/225 |
| 7,461,262 | B1* | 12/2008 | O'Toole, Jr. | G06F 21/6218 380/255 |
| 8,875,269 | B2* | 10/2014 | Austel | H04L 67/2814 726/8 |
| 8,997,222 | B2* | 3/2015 | Meliksetian | H04L 63/1441 380/242 |
| 9,075,990 | B1* | 7/2015 | Yang | H04L 63/105 |
| 9,197,623 | B2 | 11/2015 | Srinivasan et al. | |
| 9,332,433 | B1 | 5/2016 | Dotan et al. | |
| 9,819,678 | B1* | 11/2017 | Agrawal | H04L 63/0876 |
| 10,178,114 | B2* | 1/2019 | Safruti | H04L 67/02 |
| 2002/0112155 | A1* | 8/2002 | Martherus | H04L 63/0815 713/155 |
| 2003/0158777 | A1* | 8/2003 | Schiff | G06Q 30/0272 705/14.53 |
| 2004/0268152 | A1* | 12/2004 | Xia | H04L 63/0281 726/5 |
| 2005/0038996 | A1* | 2/2005 | Meyerson | H04L 63/0227 713/165 |
| 2007/0101405 | A1* | 5/2007 | Engle | H04L 63/0272 726/4 |
| 2008/0052392 | A1* | 2/2008 | Webster | G06Q 30/02 709/224 |
| 2009/0063491 | A1* | 3/2009 | Barclay | H04L 67/42 |
| 2009/0125719 | A1* | 5/2009 | Cochran | G06Q 30/02 713/171 |
| 2011/0167479 | A1 | 7/2011 | Maes | |
| 2011/0239283 | A1* | 9/2011 | Chern | H04L 63/0815 726/6 |
| 2012/0089700 | A1 | 4/2012 | Safruti et al. | |
| 2014/0115724 | A1* | 4/2014 | van Brandenburg | G06F 21/10 726/30 |
| 2014/0282881 | A1 | 9/2014 | Li et al. | |
| 2015/0128237 | A1* | 5/2015 | Lund | H04L 9/3213 726/7 |
| 2015/0143453 | A1 | 5/2015 | Erb | |
| 2015/0248697 | A1* | 9/2015 | Mahadevan | H04N 21/2396 705/14.53 |
| 2015/0256903 | A1* | 9/2015 | Walker | H04N 21/23614 725/32 |
| 2015/0373015 | A1 | 12/2015 | Mary et al. | |
| 2016/0080345 | A1 | 3/2016 | Safruti et al. | |
| 2016/0182534 | A1* | 6/2016 | Yang | H04L 63/1416 726/1 |
| 2016/0212100 | A1 | 7/2016 | Banerjee | |
| 2016/0269447 | A1* | 9/2016 | Kailash | H04L 63/1433 |
| 2016/0337336 | A1* | 11/2016 | Takayasu | G06F 21/6218 |

OTHER PUBLICATIONS

PCT International Search Report and Written Opinion, PCT Application No. PCT/US2017/056693, dated Dec. 28, 2017, 13 pages.
Extended European Search Report, European Patent Application No. 17860343.7, dated Jan. 8, 2020, 8 pages.
Open Mobile Alliance Ltd, "Authorization Framework for Network APIs: Candidate Version 1.0," Nov. 20, 2013, pp. 1-73.
Report, European Patent Application No. 17860343.7, dated Jun. 24, 2020, seven pages.

* cited by examiner

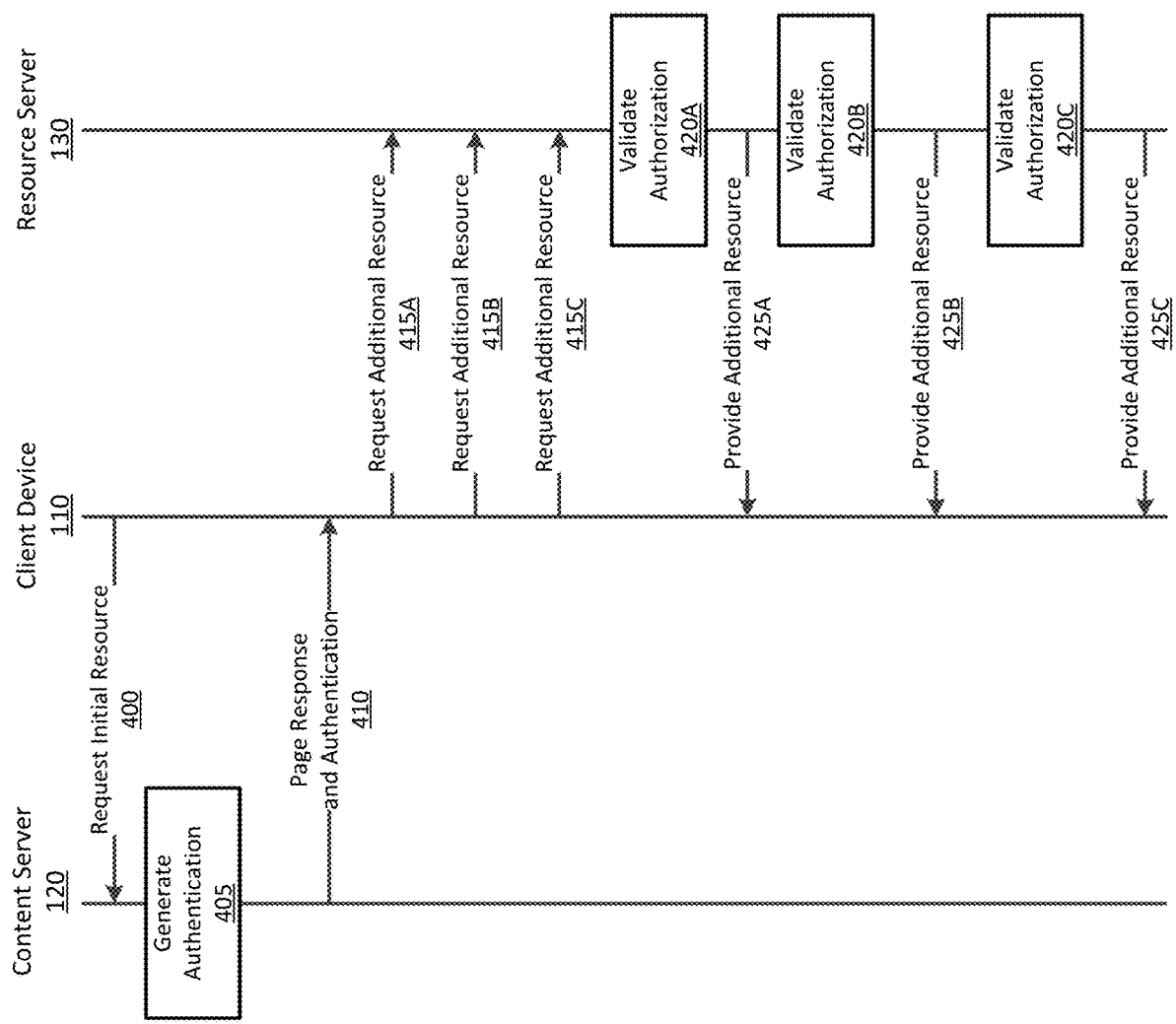

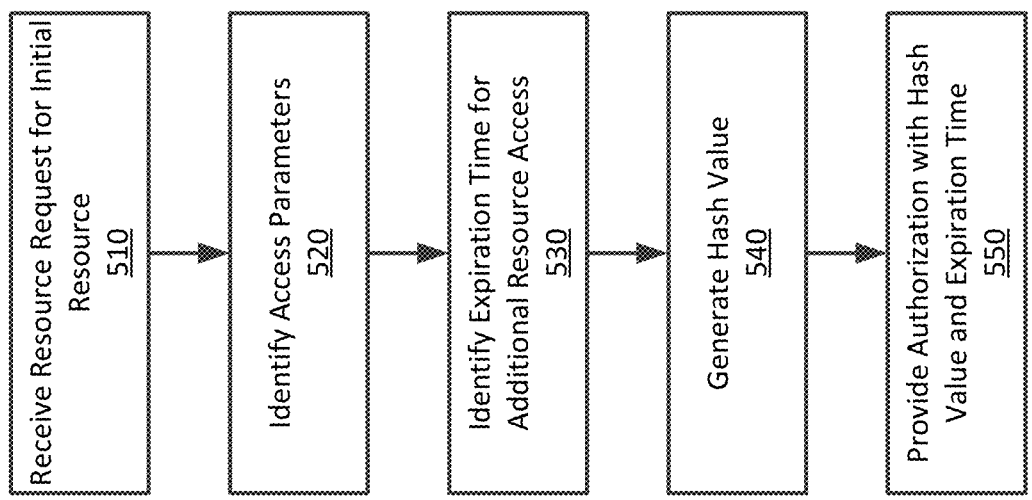

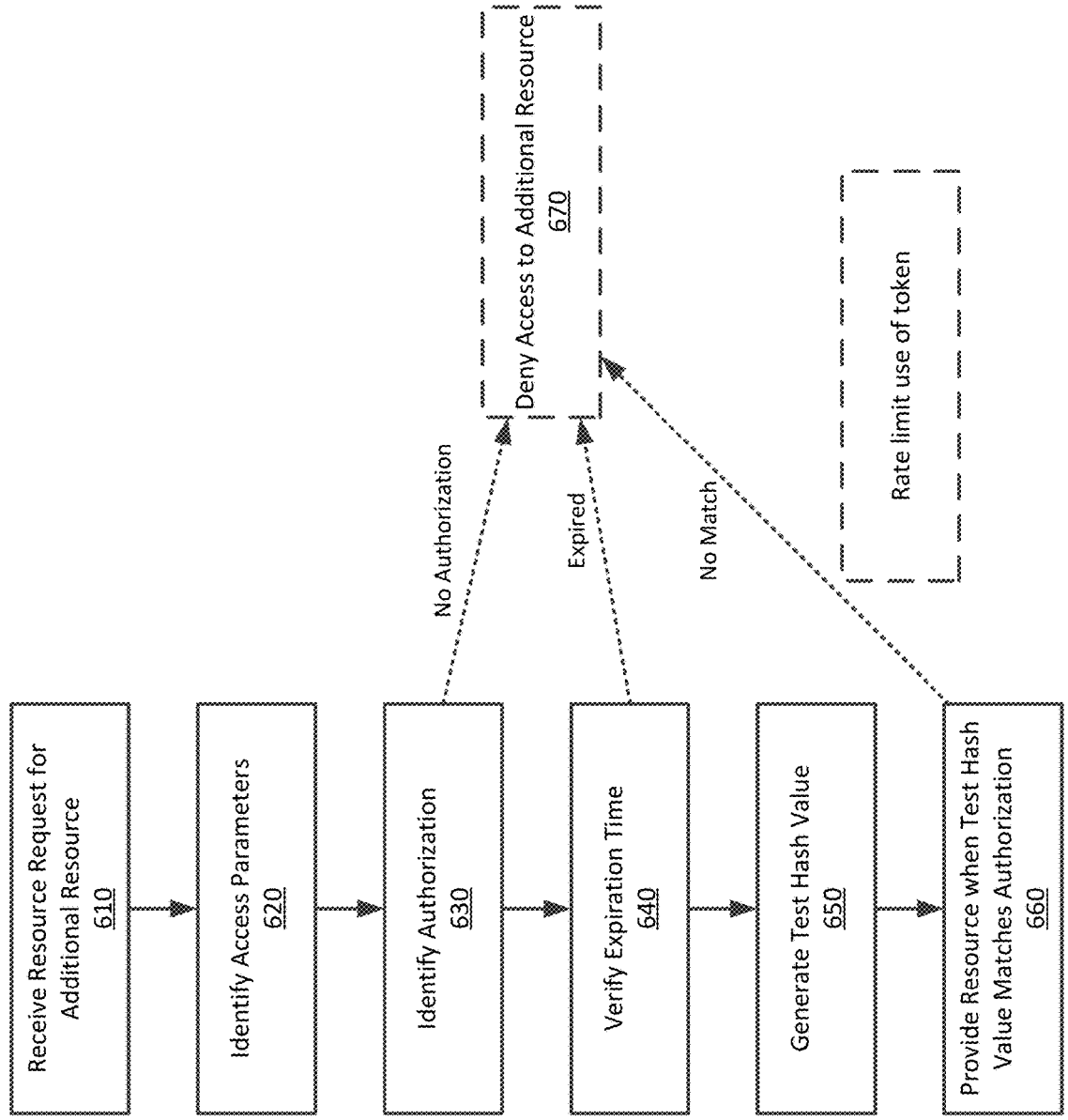

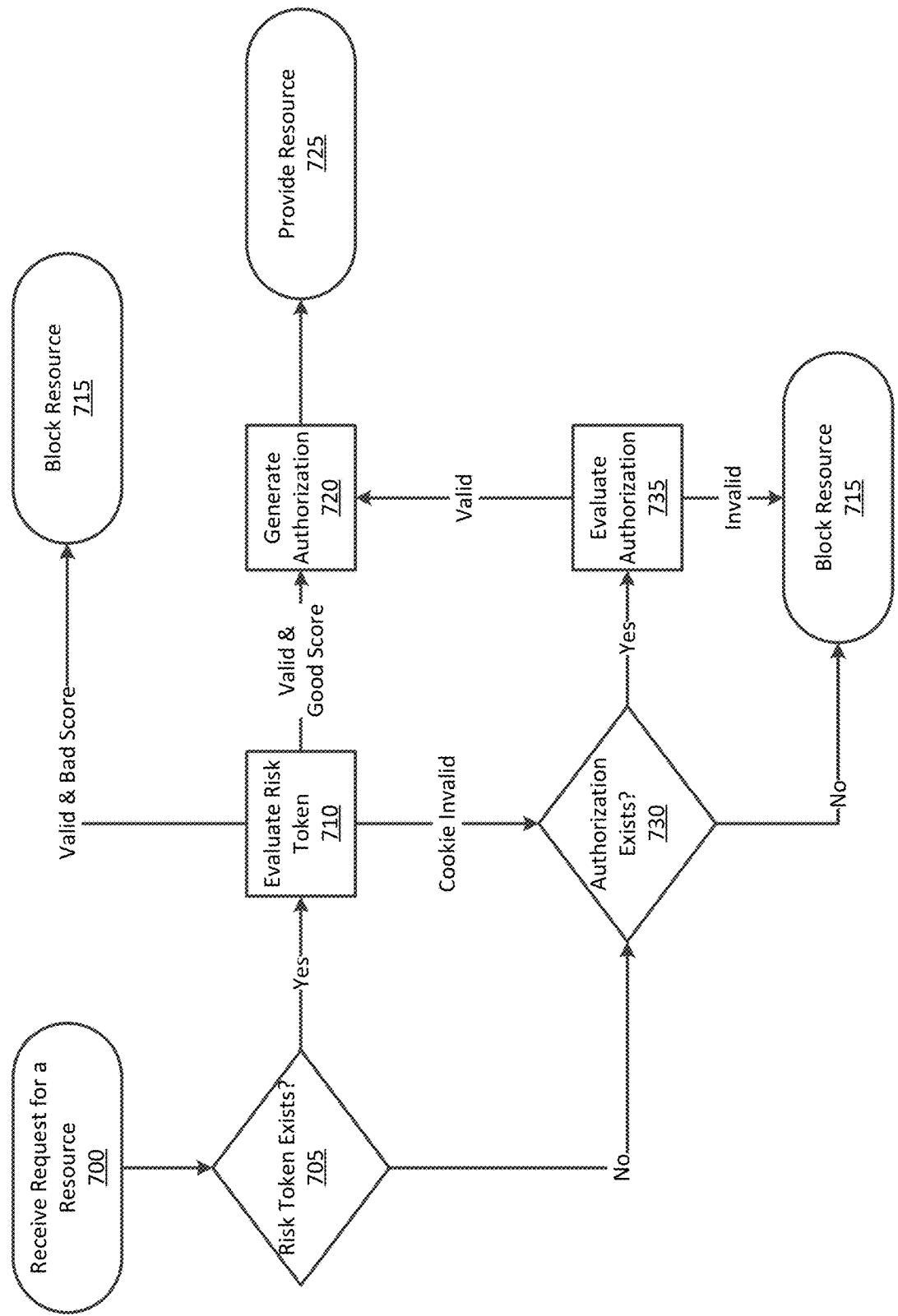

SECURING ORDERED RESOURCE ACCESS

CROSS REFERENCE TO RELATED APPLICATIONS

This application claims the benefit of U.S. Provisional Application No. 62/408,279, filed Oct. 14, 2016, which is incorporated by reference in its entirety.

BACKGROUND

This invention relates generally to securing access to content, and particularly to enforcing an ordered access to content by a client device.

Client devices access content via networked devices, typically by specifying a host or domain or a networking address and a particular resource requested by the client device. For example, a client device may request content at a domain abc.com and request a page of content at the domain as a resource, such as a news.html. These resources typically reference additional resources for inclusion in presenting the resource to the user. For example, a webpage may reference or embed images, text, an additional content window, an iframe, scripts, tracking pixels, etc. within the resource. In modern devices, the selection of this content may also be dynamically determined based on scripts and other actions within a page or by interactions of a user with a resource and may not be predetermined.

These referenced or "embedded" resources within a resource may typically be accessible by a client device that directly requests that resource and may be stored or hosted on different servers or machines than the initially-accessed page. However, the ability of client devices (or other, less friendly actors) to directly access these resources (for example, by directly accessing a reference to the resource) may be undesirable and allow revealing these embedded resources to others or permit a client device to access the embedded resources at any time. Thus, content providers may wish to enforce an ordered access to resources, such as an access to the initial resource and subsequent access to the additional resources, that is easy to administer and may enforce this order with low overhead and while ensuring that client devices may access the additional resources for a limited time.

SUMMARY

A content owner protects access to resources by enforcing an order on resource access. To access additional resources, the content owner requires the client device to have recently accessed an initial resource. Typically, the initial resource includes a reference to or embeds the additional resources, which may be retrieved by the client device to populate the initial resources or as an additional resource accessed by navigating the initial resource.

To enforce this ordering, when the client device requests access to an additional resource, the client device presents an authorization obtained by accessing the initial resource. The authorization is verified by the system providing the additional resource before providing the additional resource to the client device.

When the client device requests access to the initial resource, the content server providing the initial resource generates the authorization using access parameters of the request. The access parameters describe characteristics of the request or the client device, such as the requested hostname specified in the access, a designated user-agent of the client device, or the client device's network address (e.g., an Internet Protocol (IP) address). These characteristics that describe the request may be included in or inferred from the request, such as an http request, to access the resource, and are expected to be the same when the client device provides a request for the additional resource. That is, the same access parameters are expected to be identifiable in a request from the same user device for the additional resource. The service provider generates a "token" for the client device by applying a cryptographic signature, such as a cryptographic function or hash function like HMAC (Hash-based Message Authentication Code), to the access parameters, an expiration time for access to the content and an additional secret key known only to the service provider that is used to generate and to validate the token. The token and the expiration time are included in an authorization sent to the client device to permit the device to access an additional resource after accessing the initial resource. The authorization may be provided in various forms, such as a token or cookie to the client device, or the authorization may be used to modify a reference to the additional resource. The token may be generated with additional parameters, such as a content identifier of the additional resource, a session token or session identifier. In addition, the system may perform additional verification of the user device before generating an authorization for the additional content and include results of the additional verification in the authorization or as a separate token. The additional verification may designate a risk score of the client device, which may describe characteristics of the client device when accessing the initial resource.

When a request to retrieve the additional content is provided by the client device, the client device includes the authorization in the request for additional content. For example, the authorization may be in a cookie provided with the request or implicit in a modified resource reference. The request for additional content is provided to a resource server, which may differ from the content provider of the initial resource. Before providing the additional content, the resource server identifies access parameters of the request for the additional content. The expiration time and token are identified from the authorization. The expiration time and access parameters are cryptographically signed via the same function as applied by the content server to determine a test token for comparison with the token of the authorization. In this way, the system having the additional content can re-generate the hash using the access parameters and expiration time, permitting the system to validate the authorization and enforce the limited expiration time for accessing resources related to the initial resource. When the tokens match, the additional resource is provided to the client. This configuration permits and enforces the ordered access of resources while permitting fast generation and verification of the authorization. In additional examples, the resource server may also rate-limit the requests for additional content to prevent responding to requests at a high frequency, and may limit the number of times that a particular authorization is valid.

Relative to other access control schemes, these techniques permit fast and easy verification by the resource server. Because the information for verification may be derived from the resource request itself, the servers may not be required to maintain separate data regarding issued tokens, sessions, generate additional identifying information about a request to be maintained, or transmit such information between them. Accordingly, in some embodiments the resource server does not need additional information from external systems beyond the authorization and the resource request to verify that the client device properly accessed (and received the authorization from) accessing the initial resource.

BRIEF DESCRIPTION OF THE DRAWINGS

Figure (FIG. 1 illustrates an environment for providing ordered access to additional resources by a client device.

FIG. 4 shows a timing diagram for requesting an initial resource and additional resources, according to one embodiment.

FIG. 5 illustrates an example process for generating an authorization for an additional resource, according to one embodiment.

FIG. 6 shows an example process for verifying an authorization to provide an additional resource.

FIG. 7 illustrates a process for controlling access to resources, according to one embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

Figure 1:
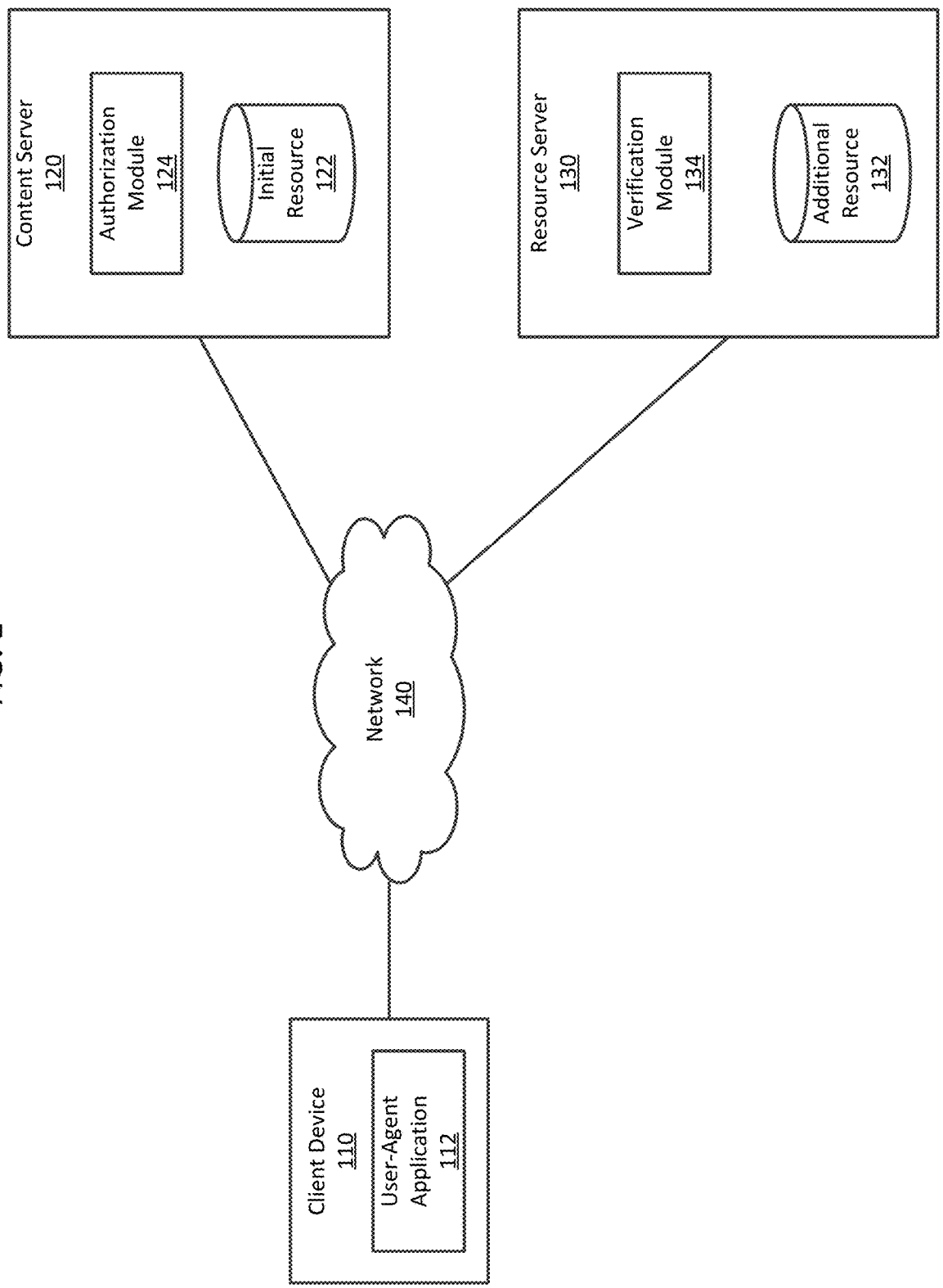

FIG. 1 illustrates an environment for providing ordered access to additional resources by a client device 110. The client device 110 accesses resources at a content server 120 and additional resources at a resource server 130 via a network 140. The content server 120 provides an authorization to the client device 110 to access resources by the resource server 130 and the resource server permits access to additional resources when presented with a valid authorization by a client device. The authorization may be generated based on access parameters of the client device 110, cryptographically describing characteristics of the client device and its access to content, permitting the authorization to be verified by the resource server 130 based on the request for the additional content.

In this environment, a client device 110 executes a user-agent application 112 that requests resources from the content server 120. When the client device 110 accesses resources from the content server 120, the user-agent application 112 executing on the client device 110, the resource may specify additional resources to be used with the initially-accessed resource. The initially-accessed resource is referred to as an 'initial resource" and resources that are intended by a content owner to be accessed after the initial resource are termed are additional resources. A typical example of this ordered access to resources includes a webpage containing references to resources for populating the webpage.

Figure 2:
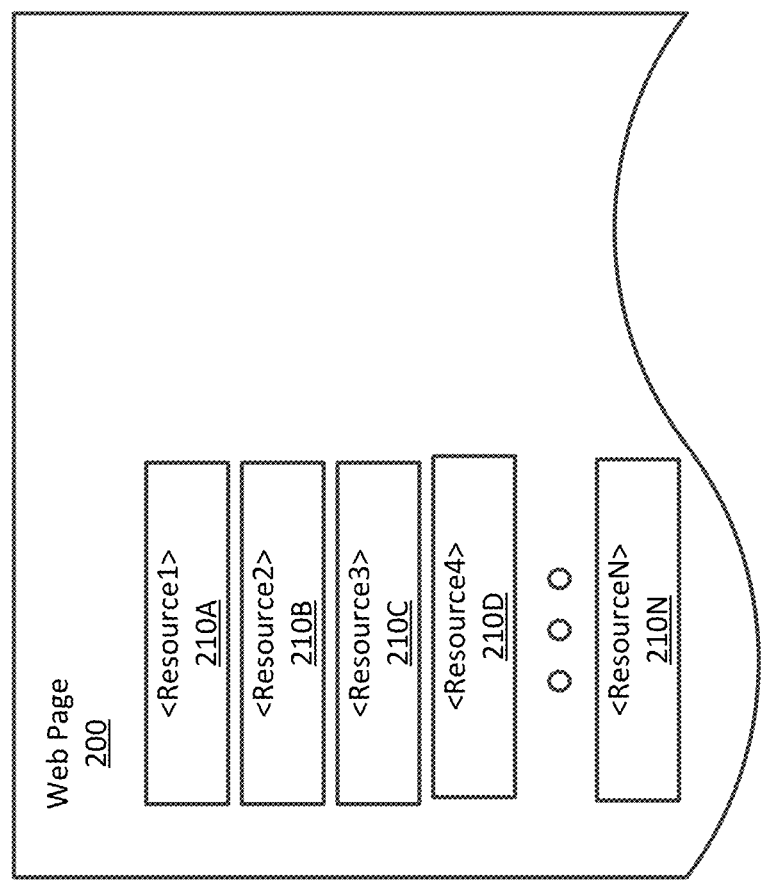
FIG. 2 illustrates an example initial resource referencing additional resources, according to one embodiment.

FIG. 2 illustrates an example initial resource referencing additional resources, according to one embodiment. In this example, an initial resource, a webpage 200, includes a reference to additional resources 210A-210N. Typically, the initial resource may be an HTML object or other page or resource requested by a user-agent. This initial resource is typically the resource indicated to a user, for example in a navigation bar of the user-agent application (e.g., a browser). The initial resource in this example includes references designating a path for accessing additional resources 210A-210N. In this example of an initial resource, the initial resource contains a reference to the additional resources 210A-N. In alternate examples, the additional resources may be determined dynamically, for example by a script or other interpretation of the initial content by the client device. When the user-agent renders the initial resource to the user, or a user interacts with the initial content, the user-agent requests the additional resources to properly render the page to the client. Accordingly, these additional resources are typically associated with or related to the initial page, and typically a content owner may wish to prevent access to the additional resources unless the client is properly accessing the initial content. The additional resources 210 may include images, video, scripts, media files, embedded objects, scripts, and so forth. The initial resource and additional resources are not necessarily specified or referenced in the initial resource itself; the authorization and verification discussed below may be used to enforce any ordered presentation of resources; for example the initial resource may not contain or reference any other resources, but the system may still restrict access to additional resources to devices which first accessed the initial resource.

Returning to FIG. 1, the client device 110 thus includes the user-agent application 112 which may request resources and provide the resources to a user of the device and may be a web browser or another type of native application executing on the client device 100. In this example, when the client device accesses an initial resource, it identifies reference, such as a universal resource locator (URL), for the initial resource. In the user-agent application 112, this initiates a request for the initial resource, such as an HTTP request, to be sent by the user-agent application 112 to the content server 120 through the network 140, such as the Internet. This HTTP request may be encrypted, such as in a HTTPS connection (Hypertext Transfer Protocol Secure) which layers HTTP over a Secure Socket Layer (SSL) or Transportation Layer Security (TLS).

The content server 120 maintains initial resources 122. When providing the initial resource, the content server 120 also provides an authorization to the client device 110 for accessing the additional resources, which may be located at resource server 130. Though in some configurations the content server 120 and 130 are separate systems, such as shown in FIG. 1, in other configurations the resource server 130 functionalities may be performed by the content server 120, in which case the same system may provide authorization as well as verify an authorization before providing an additional resource 132. In addition, the content server 120 or resource server 130 may be located through a content delivery network, content proxy, load balancer, or other means of directing requests to networked systems.

The content server 120 includes an authorization module 124 that provides an authorization to the client device 110 to permit the client device 110 to access the additional resource 132. The authorization module 124 embeds a token determined based on access parameters of the request for content. The access parameters may also be determined by the resource server 130 when receiving a request for additional resource 132, permitting the resource server 130 to validate the request by a test token using the access parameters it observes and comparing the test token to a token in the authorization.

Figure 3:
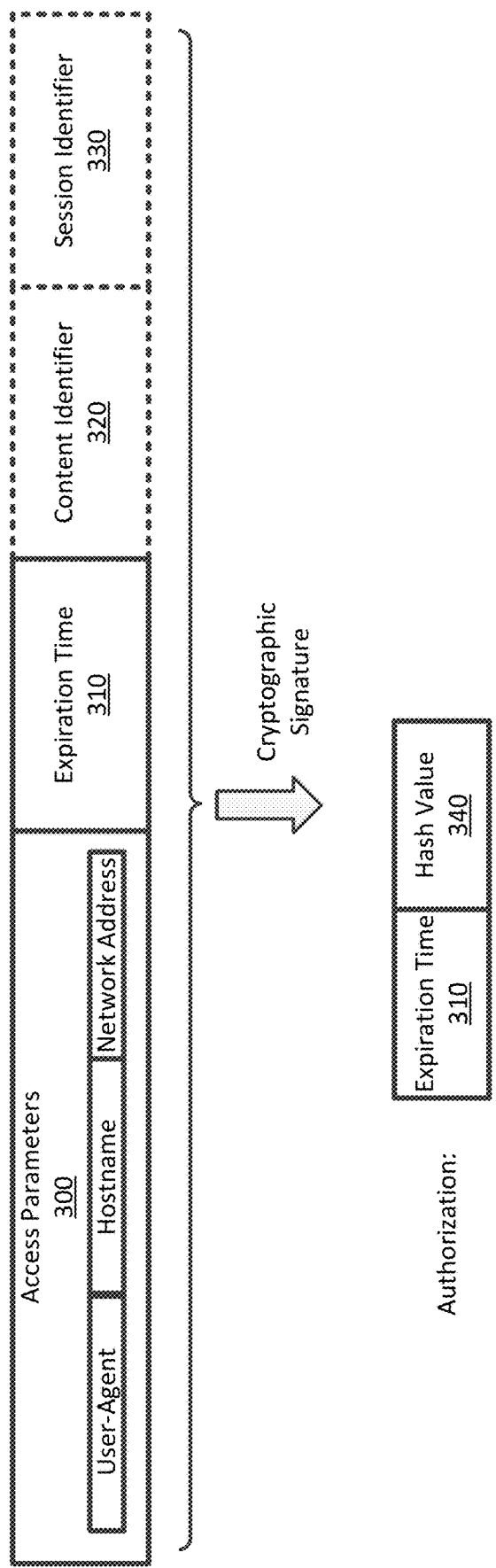
FIG. 3 illustrates an example of generating an authorization, according to one embodiment.

FIG. 3 illustrates an example of generating an authorization according to one embodiment. The authorization module 124 at the content server 120 may generate a hash value by applying a cryptographic signature to parameters related to the request. The cryptographic signature is typically a one-way hash function, such that generating the input values to the hash function is infeasible given the hash value (e.g., the token) as output of the hash function. Any consistent function which translates the parameters to the same token may be used. The hash function is applied to the information derived from the request with the addition of a secret key known only to the service provider and shared between the authorization module generating the authorization and the resource server validating it. The key in many cases is given as a parameter to the hash function, but could also be added to the parameters that the hash function operates on.

The parameters applied to the cryptographic signature function include access parameters 300 characterizing the request for content. The access parameters may be obtained from or derived by analyzing the request from the user device that was received by the content server 120. In this example, the user-agent, hostname, and network address of the client device may be used as access parameters to generate the hash value 340. The user-agent describes the characteristics of the user-agent application executing on the client device, for example by specifying the type and version of application originating the request for content. The hostname may specify the domain or host computer from which the content is requested. For example, the domain "abc.com" or subdomain "sub1.abc.com" may be specified in the request, indicating the client device is requesting content from that domain. In addition, the network address may indicate a networking address, such as an IP address, of the user device. These various access parameters may be identified from the request; for example, when the request is an HTTP request, the authorization module may identify these parameters from the related HTTP headers for "user-agent" or determine a hostname from an "origin" or "referrer" HTTP headers.

Any combination of similar parameters that describe the request by the client device 110 that may also be present when requesting the additional resources may be used as access parameters 300. Since these may characterize the identity of the requesting client device and what information it is requesting, these parameters may associate the request more closely to the specific requesting system and requested content.

To limit the time period during which the client device 110 may access the additional resource, the authorization module 124 identifies an expiration time 310 for the request. The expiration time may be determined based on a specified time from the current time, and may be specified in a uniform or global time, or with respect to a system epoch. The expiration time is typically determined by adding an amount of time to the current time, for example 5 seconds, one minute, or fifteen minutes. The amount of time is typically short and may be set according to the expected time between an access for the initial resource and the additional resources. For example, the time may be set 5 seconds or less when the user device is expected to retrieve the additional resources immediately to generate a page for display to the user, like in the case of a web browser.

The parameters for the cryptographic signature may also include a content identifier 320 or a session identifier 330. The content identifier may specify an identifier of the additional resource that the client device is permitted to access. The content identifier may be specific to a particular content item, or may identify a group of content items. When the content identifier is used, a different authorization may be generated for each of the additional content items to be accessible by the client device 110. The session identifier 330 may describe a session token or other session information for the device.

Additional parameters may also be included for use with the cryptographic signature. For example, a salt may also be included in the parameters for the cryptographic signature, such that at least one parameter of the cryptographic signature is not accessible by the client device 110. The salt may be provided to the resource server 130 for inclusion in its application of the cryptographic signature.

The cryptographic signature may be applied to the parameters by concatenating the parameters as a string, organizing the parameters to a data structure, or otherwise providing a defined and repeatable means for organizing the parameters for applying the cryptographic signature. After applying the cryptographic signature, a hash value 340 is generated that describes these parameters. The hash value 340 is included with the expiration time in the authorization sent to the client device 110.

The authorization may be provided in various ways. In one example, the authorization is a token provided to the client device 110, such as a cookie or other token for the client device to provide with requests for content relating to a host. In other examples, the authorization is generated and used to modify the reference to a resource, for example as provided in the initial content item. For example, the reference to an additional resource having a URL of "abc.com/image.jpg" may be modified by appending an authorization as a parameter or query string: "abc.com/image.jpg?expiration=<expirationtime>&hash=<token value>". In this example, each additional resource may also have an authorization specific to that resource, for example to incorporate an authorization that includes a content identifier parameter in the cryptographic signature.

FIG. 4 shows a timing diagram for requesting an initial resource and additional resources, according to one embodiment. In this example, a client device 110 requests an initial resource from the content server 120. The content server identifies access parameters from the request and generates an authorization. The authorization is provided with the response and initial resource for the client device. The client device may then request additional resources 415A-C from the resource server 130 and include the authorization. For each of the additional resources, the resource server 130 may validate 420 each authorization before providing the additional resource 425 to the client device 110. In this example, each additional resource, is separately validated 420A-C and provided 425A-C. In some examples, more than one additional may be specified in a request, and one validation is performed for the group of requested additional resources.

FIG. 5 illustrates an example process for generating an authorization for an additional resource, according to one embodiment. This process may be performed, for example, by the authorization module 124. When a request for an initial resource is received 510, the authorization module identifies access parameters 520 for the request and an expiration time 530 for accessing the additional resources as discussed above. Additional parameters may also be identified for the cryptographic signature, such as the content identifier or salt. From these parameters, the token for the authorization is generated 540 and provided 550 with the expiration time to the client device. Though a specific order is shown here, other orders for processing these steps may be used, as well as the omission and addition of additional steps. For example, the expiration time may be determined before the access parameters, and additional requirements for authorization may also be used.

In one example, the authorization module may perform additional verification of the client device before providing an authorization to the client device. This additional verification may include a log-in or other identity verification. In addition, the verification may use a verification of the operating environment of the client device, for example based on a risk score or other characteristics of the client device. This risk score may be provided in a risk token or other credential provided by the client device. For example, as discussed by U.S. patent application Ser. No. 14/855,101, which is hereby incorporated by reference, a set of security tests may be provided to the client application for execution by the client application. The results of the security tests are analyzed to determine whether the client device behaves as expected for the user-agent reported by the request for content. Based on the results of the security tests, a risk score may be generated for the device and presented by the client device in a risk token. The risk score and generation of risk token may be performed by a third party security system. Thus, the access to the initial resource and generation of an authorization may be based on the risk score meeting a threshold score. In other embodiments, the risk score may be included in the authentication, for example when the authentication itself is a token or cookie, and this risk score may be analyzed before providing the additional resource. A further example embodiment using a risk score is discussed in FIG. 7.

Referring back to FIG. 1, to verify the authorization by the resource server 130, a verification module 134 receives a request for the additional resource. The verification module 134 verifies that the request includes an authentication and that the authentication may be verified with the access parameters of the request before providing the additional resource 132. Since the authorization specifies the expiration time, and the token in the resource request relies on the correct expiration time, the expiration time for the request can be effectively enforced by the verification module to ensure that the additional resource is provided in the specified timeframe. The verification module 134 generates a test token to match against the token provided in an authorization of the request, and grants access to the additional resource when the tokens match. The expiration time or access parameters cannot effectively be modified by the client device to request the additional resource without obtaining an authorization generated by the content server, because the token would no longer match the test result generated by the resource server 130.

FIG. 6 shows an example process for verifying an authorization to provide an additional resource. This process may be performed by the verification module 134. To initiate the process, the verification module receives a request for the additional resource 610. The authorization process obtains the parameters that were used in the generation of the authentication to determine if the token of the parameters as obtained by the verification module match those as determined by the authentication module and provided in the authentication. Thus, the verification module analyzes the access request to identify 620 the access parameters of the request as presented in the request for the additional resource. The process next identifies 630 the authorization provided by the client device to identify the expiration time and token provided in the authentication. When there is no authentication, the process may deny 670 access to the additional resource.

Next, the verification process may verify that the expiration time is later than the current time of the verification system. In addition, when the authentication is provided by a cookie or token, the verification process may confirm that the cookie itself is not expired. When the expiration time has already occurred, the authentication may be treated as expired and access denied to the resource.

Using the access parameters and expiration time, the verification process assembles parameters for generating 650 a test token. In addition to the access parameters an expiration time, the verification process may include a content identifier of the additional resource, a session identifier, a salt, or other parameters. These parameters used by the verification match the set of parameters used by the authentication generation process. The test token is generated by applying the cryptographic signature (e.g., the hash function) to the parameters. When the test token matches the token provided in the authorization, the resource is provided 660 to the client device, and otherwise access may be denied 670 to the resource.

In additional embodiments, additional requirements or limitations may also limit access to the resource. For example, the number of time that a particular authorization may be used may be limited, for example to one, two, or five times, or may be limited to a specific frequency, such as once per thirty seconds. When these limitations are exceeded, the authorization may be rejected until a new authorization is obtained by the client device (e.g., by accessing the initial resource again).

FIG. 7 illustrates a process for controlling access to resources, according to one embodiment. In this process, the client device may provide a risk token, an authentication, or both to access a resource. In this example, the risk token may include a risk score that describes the response of the user-agent on the client device to a set of security tests. In this example, the risk token may be used as an alternate means to verify a client device, or to verify whether to generate an authorization for a resource.

Initially, a request for the resource is received 700. The process determines 705 whether a risk token exists, and if so, evaluates 710 the risk token to determine if the risk token has a sufficient risk score relative to a threshold. When the risk token exists and reflects an insufficient or 'bad' score, the resource may be blocked 715. When the risk token exists and has a sufficient score, an authorization may be generated 720 for the resource and/or for additional resources as discussed above.

When the risk token does not exist, the process may then check for whether an authorization is presented and exists 730 with the request. If so, then the authorization may be evaluated and verified 735 as discussed above to determine whether the authorization may provide an alternate pathway for verifying access to the resource and either blocking 715 the resource or permitting the resource to be provided 725. In one alternative, when the authorization is evaluated 735 and is valid, the authorization may be re-generated 720, for example to set a new expiration time for a new authorization. In this example, the continuing use of the authorization, even without a risk token, may be used to renew the authorization for a client device.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for securing ordered resource access of an initial and an additional resource, the method comprising:
   receiving, at a service provider over a network, a request for the initial resource from a client device;
   responsive to receiving the request for the initial resource:
      identifying access parameters of the request for the initial resource, the access parameters describing one or more characteristics of the request or client device that are also identifiable for a future request from the client device for the additional resource at a resource provider;
      verifying that the client device is authorized to access the initial resource;
      identifying an expiration time for authorized access by the client device to the additional resource after accessing the initial resource;
   generating, by the service provider, a token for the initial request, the token derived by applying the access parameters and the expiration time to a hash function using a secret key;
   generating an authorization for access to the additional resource, the authorization including the token and the expiration time;
   responsive to generating the authorization, transmitting, by the service provider over the network, the initial resource to the client device;
   transmitting, by the service provider over the network, the secret key to the resource provider to authorize requests for the additional resource; and
   providing the authorization to the client device for inclusion by the client device in the future request for the additional resource, the future request authorized by the resource provider, using the authorization, by applying the access parameters in the future request to the hash function using the secret key to confirm the initial resource was first provided to the client device by the service provider.

2. The method of claim 1, wherein the access parameters include a hostname designated in the request for the initial resource, a user-agent designated in the request for the initial resource, or a networking address originating the request for the initial resource.

3. The method of claim 1, wherein the expiration time is within a short time range from a current time.

4. The method of claim 1, wherein the resource provider authorizes the future request by:
   identifying the access parameters in the future request;
   generating a test token for the second request for the second resource, the resource provider deriving the test token by applying the secret key to the access parameters and the expiration time; and
   comparing the test token to the token included in the authorization.

5. The method of claim 4, wherein the resource provider and the service provider are components of a content-delivery network.

6. The method of claim 1, wherein the initial resource is a containing page including a reference to the additional resource.

7. The method of claim 1, wherein the additional resource is embedded in the first resource.

8. The method of claim 1, wherein the authorization is an authorization token encoding the token and the expiration time.

9. The method of claim 8, wherein the authorization includes a risk score of the client device.

10. The method of claim 1, wherein the authorization is a modification of a reference to the additional resource.

11. A non-transitory computer-readable storage medium containing computer program code for:
   receiving, at a service provider over a network, a request for the initial resource from a client device;
   responsive to receiving the request for the initial resource:
      identifying access parameters of the request for the initial resource, the access parameters describing one or more characteristics of the request or client device that are also identifiable for a future request from the client device for the additional resource at a resource provider;

verifying that the client device is authorized to access the initial resource;

identifying an expiration time for authorized access by the client device to the additional resource after accessing the initial resource;

generating, by the service provider, a token for the initial request, the token derived by applying the access parameters and the expiration time to a hash function using a secret key;

generating an authorization for access to the additional resource, the authorization including the token and the expiration time;

responsive to generating the authorization, transmitting, by the service provider over the network, the initial resource to the client device;

transmitting, by the service provider over the network, the secret key to the resource provider to authorize requests for the additional resource; and providing the authorization to the client device for inclusion by the client device in the future request for the additional resource, the future request authorized by the resource provider, using the authorization, by applying the access parameters in the future request to the hash function using the secret key to confirm the initial resource was first provided to the client device by the service provider.

12. The storage medium of claim 11, wherein the access parameters include a hostname designated in the request for the initial resource, a user-agent designated in the request for the initial resource, or a networking address originating the request for the initial resource.

13. The storage medium of claim 11, wherein the expiration time is within a short time range from a current time.

14. The storage medium of claim 11, wherein the resource provider authorizes the future request by:

identifying the access parameters in the future request;

generating a test token for the second request for the second resource, the resource provider deriving the test token by applying the secret key to the access parameters and the expiration time; and comparing the test token to the token included in the authorization.

15. The storage medium of claim 14, wherein the resource provider and the service provider are components of a content-delivery network.

16. The storage medium of claim 11, wherein the initial resource is a containing page including a reference to the additional resource.

17. The storage medium of claim 11, wherein the additional resource is embedded in the first resource.

18. The storage medium of claim 11, wherein the authorization is an authorization token encoding the token and the expiration time.

19. The storage medium of claim 18, wherein the authorization includes a risk score of the client device.

20. The storage medium of claim 11, wherein the authorization is a modification of a reference to the additional resource.

21. A method for verifying access to a resource to be accessed subsequent to an initial resource, comprising:

receiving, by a resource provider, a secret key from a service provider over a network;

receiving, by the resource provider from a client device over the network, a resource access request for a first resource, the resource access request including an authorization for access to the first resource generated by the service provider during a previous request for an initial resource and provided by the service provider to the client device responsive to providing the initial resource to the client device;

identifying one or more access parameters of the resource access request, the access parameters describing one or more characteristics of the resource access request or client device identifiable for the previous request for the initial resource;

identifying, in the authorization, an expiration time and a token for the resource access request;

generating, by the resource provider, a test token, the test token derived by applying the access parameters and the expiration time in the authorization to a hash function using the secret key;

comparing the test token to the token identified in the authorization in order to confirm that the initial resource was first provided to the client device by the service provider; and responsive to the test token matching the token identified in the authorization based on the comparison, transmitting the resource to the client device over the network.

22. The method of claim 21, wherein the access parameters include a hostname designated in the resource access request, a user-agent designated in the resource access request, or a networking address originating the resource access request.

23. The method of claim 21, wherein the first resource is an embedded resource for another page.

24. The method of claim 21, wherein the authorization is an authorization token encoding the token and the expiration time identified in the authorization.

25. The method of claim 21, wherein the authorization is a modification to a reference to the first resource.

* * * * *